April 1, 1930.  F. H. TENNEY  1,753,178
SAFETY CLUTCH FOR TIRE CONVEYERS
Filed April 3, 1926  3 Sheets-Sheet 1

INVENTOR.
FREDERICK H. TENNEY
BY
ATTORNEY.

INVENTOR.
FREDERICK H. TENNEY
ATTORNEY.

Patented Apr. 1, 1930

1,753,178

UNITED STATES PATENT OFFICE

FREDERICK H. TENNEY, OF AKRON, OHIO, ASSIGNOR TO THE FIRESTONE TIRE AND RUBBER COMPANY, OF AKRON, OHIO, A CORPORATION OF OHIO

SAFETY CLUTCH FOR TIRE CONVEYERS

Application filed April 3, 1926. Serial No. 99,486.

This invention relates to clutches and particularly to a clutch adapted to cut off power to a drive shaft when the driven shaft is overloaded and is especially adapted for use in tire conveyer systems.

The chief object of the invention is to provide between a driving mechanism and a driven mechanism, a friction clutch including at least two members adapted to operate a mechanism when rotating relatively to each other to cut off power to the drive mechanism.

Particularly, the invention contemplates a friction clutch member carrying a cam and a second friction clutch member carrying a pin adapted to be actuated by the cam when the clutch members rotate relatively to each other to operate a switch or the like controlling a prime mover such as an electric motor.

Another object of the invention is to provide, in combination with a conveyer delivering tires to a tire pickup conveyer, of means for driving the tire pick-up conveyer adapted automatically to be disengaged therefrom should a tire become caught in or between the conveyers so as to bind therein.

The foregoing and other objects are obtained by the construction shown in the accompanying drawings and described below. It is to be understood that the invention is not limited to the particular application thereof shown and described herein.

Figure 1:
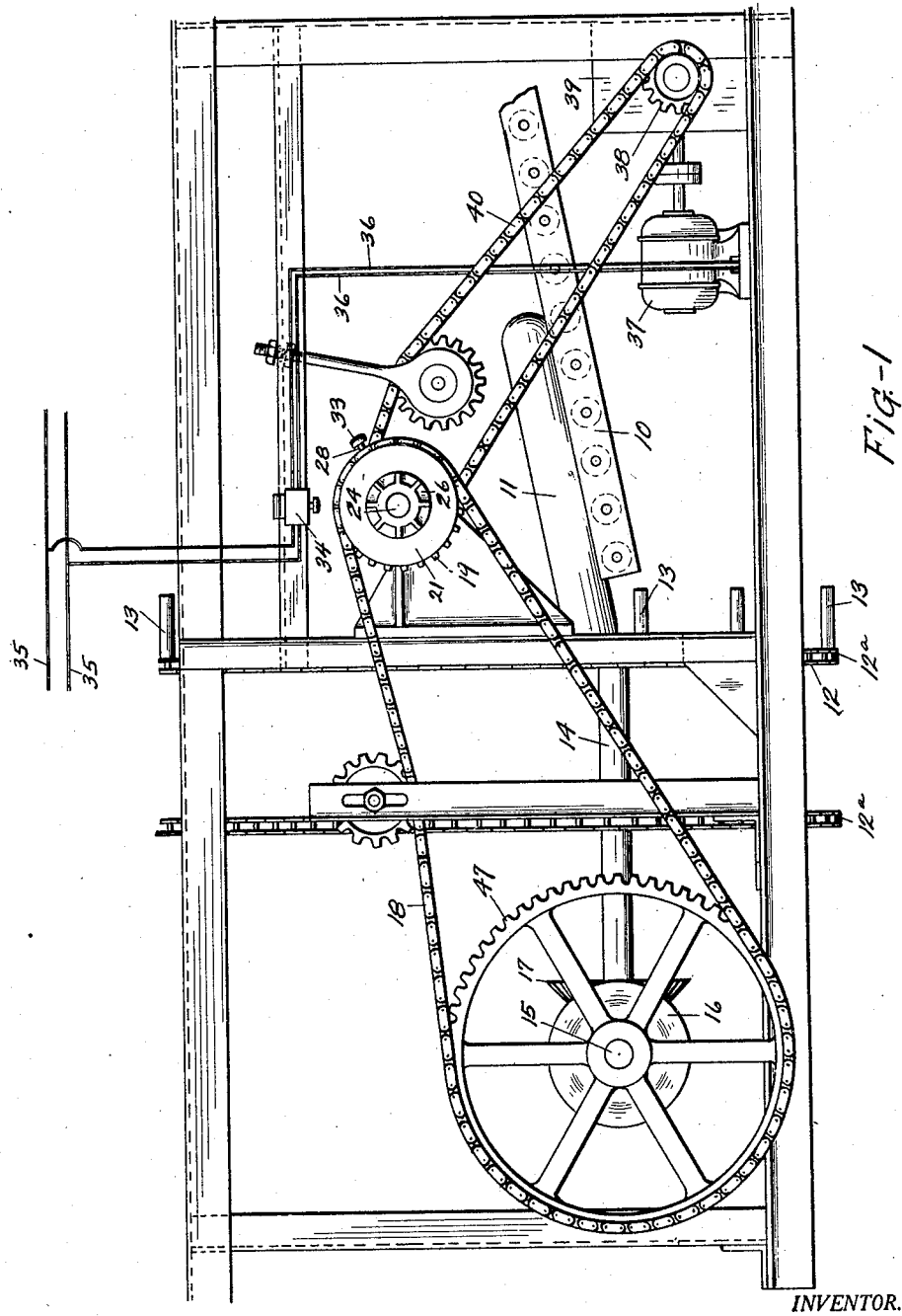
Figure 1 is a side elevation of a portion of a tire conveyer system embodying the invention.
Figure 2:
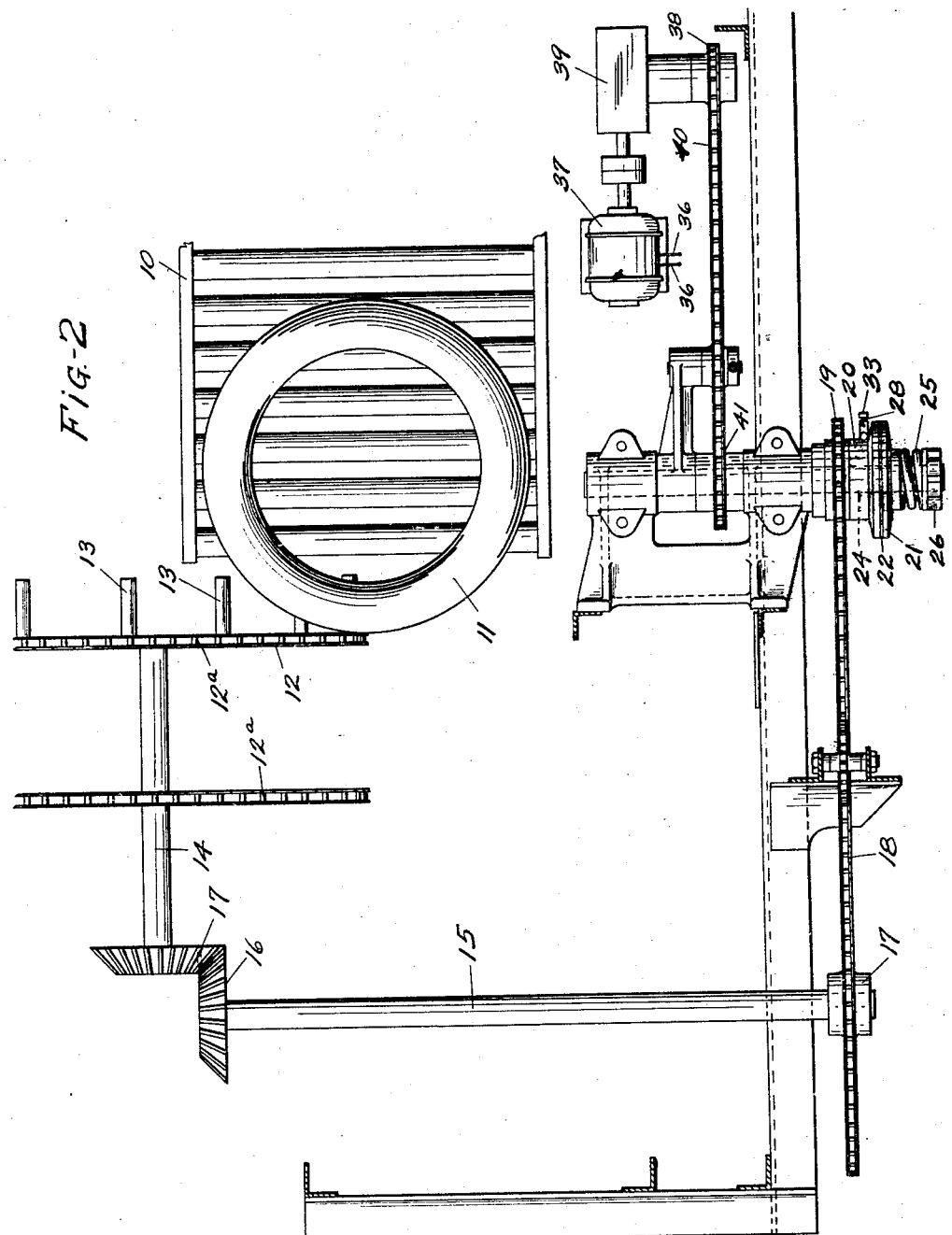
Figure 2 is a plan thereof.
Figure 3:
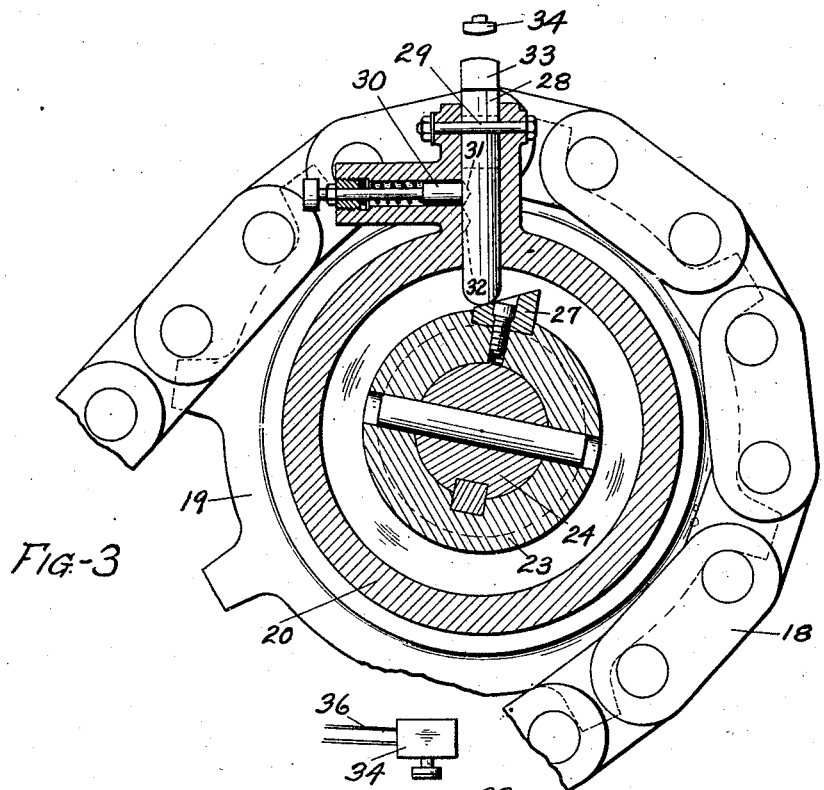
Figure 3 is a transverse section through a safety clutch employed therein.
Figure 4:
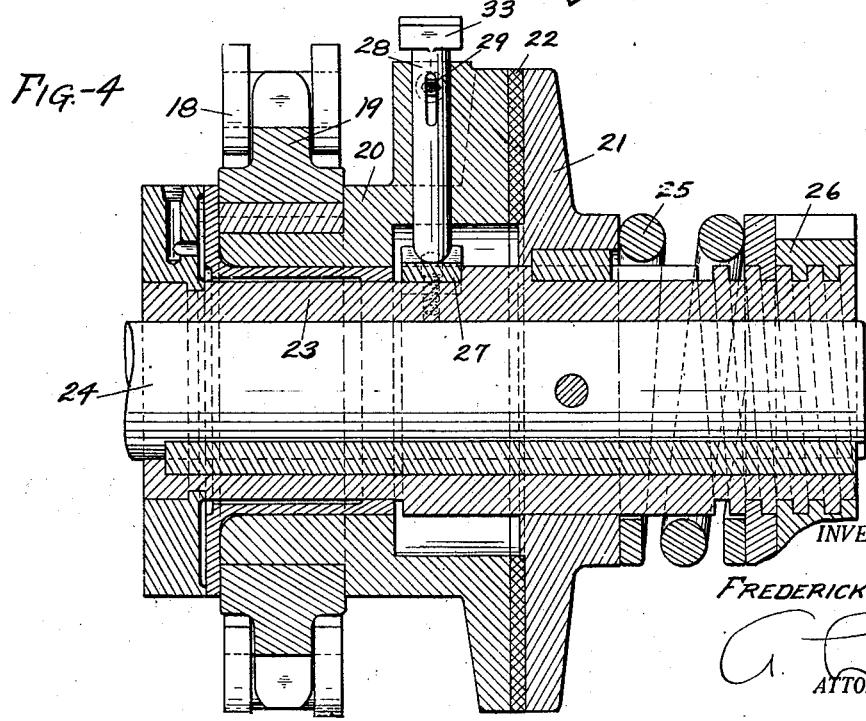
Figure 4 is a longitudinal section through said safety clutch.

Referring to the drawings, 10 represents a conveyer for delivering tires, indicated at 11, to a pick-up elevating conveyer 12 having pick-up fingers 13, 13 thereon. Conveyer 12 is driven by sprockets 12ª on a shaft 14 in turn driven by a shaft 15 through bevel gears 16 and 17.

Shaft 15 is driven by a sprocket 47 by means of a chain 18 trained thereover and driven by a sprocket 19. Sprocket 19 is secured on one member 20 of a friction clutch having frictional engagement with the other member 21 at 22.

Clutch member 20 is journaled on a sleeve 23 which is keyed onto a drive shaft 24. Clutch member 21 is shiftably keyed or splined onto sleeve 23 and is urged against clutch member 20 by means of a spring 25, the pressure of which on clutch 21 is adjustable by means of a nut 26 threaded onto sleeve 23.

Sleeve 23 has secured thereon a cam plate 27 and clutch member 20 has radially slidably therein a pin 28 adapted to ride up on cam plate 27 if clutch member 20 slips relative to clutch member 21. Movement of pin 28 is limited by a bolt 29 extending through an elongated slot thereon. The pin 28 normally is held in its innermost and outermost positions by a spring detent 30 engaging in tapered sockets 31 or 32 in pin 28.

Pin 28 has a head 33 on its outer end arranged to engage and operate a cut-off switch 34 when pin 28 is urged outwardly by cam plate 27. Switch 34 controls the supply of power from lines 35, 35 through lines 36, 36 to a motor 37 which drives a sprocket 38 through a reduction 39. Sprocket 38 drives a chain 40 trained over a sprocket 41 secured on drive shaft 24.

It will appear from the foregoing that when conveyer 12 becomes bound as by a tire being caught between conveyers 10 and 12, or from any other cause, clutch member 20 will slip so that pin 28 will ride up on cam plate 27 and will thus be urged outwardly so that it will engage and open switch 34 whereby motor 37 will be stopped. Detent 30 will hold pin 28 outwardly until the cause of the trouble has been checked and detent 30 has been manually released to permit the pin 28 to be again urged inwardly to be reset.

It is apparent that a simple, effective device has been provided for protecting the conveyer system. It will also be apparent that modifications thereof may be resorted to without departing from the spirit thereof or the scope of the appended claims.

What is claimed is:

1. The combination with a tire conveyer, of an elevating conveyer arranged to pick up tires therefrom and means for driving the elevating conveyer including a prime mover, a friction clutch between the prime mover and the elevating conveyer, the driving clutch member having a cam thereon, the driven clutch member having a radially movable pin therein, and means for cutting off power to the prime mover adapted to be actuated by movement of the pin outwardly by the cam due to relative rotation of the clutch members.

2. The combination with power means and means driven thereby, of a friction clutch between said means comprising one member connected to the driven means, a second member connected to the driving means and yieldingly urged against the first member, a radially movable pin in the first member, a cam on the second member for moving the pin when the members rotate relatively to each other, a detent for holding the pin either in extreme inward or extreme outward positions, and means adapted to be actuated by the pin to cut off the supply of power to the power means.

3. The combination with power means and means driven thereby, of a friction clutch between said means comprising one member connected to the driven means, a second member connected to the driving means and yieldingly urged against the first member, a radially movable pin in the first member, a cam on the second member for moving the pin when the members rotate relatively to each other, and means adapted to be actuated by the pin to cut off the supply of power to the power means.

4. The combination with power means and means driven thereby, of a friction clutch between said means comprising one member connected to the driven means, a second member connected to the driving means, a radially movable pin in the first member, a cam on the second member for moving the pin when the members rotate relatively to each other, and means adapted to be actuated by the pin to cut off the supply of power to the power means.

FREDERICK H. TENNEY.